United States Patent [19]

McCord, Jr.

[11] 4,165,668
[45] Aug. 28, 1979

[54] MITER GAUGE FOR TABLE SAW

[75] Inventor: Wilfred M. McCord, Jr., Louisville, Ky.

[73] Assignee: Vermont American Corporation, Louisville, Ky.

[21] Appl. No.: 890,633

[22] Filed: Mar. 20, 1978

[51] Int. Cl.² ............................................. B27B 27/06
[52] U.S. Cl. ................................. 83/435.1; 83/437; 83/425; 269/110
[58] Field of Search ................... 33/76, 120; 83/435.1, 83/437, 431, 425; 269/110

[56] References Cited

U.S. PATENT DOCUMENTS

| | | | |
|---|---|---|---|
| 2,857,943 | 10/1958 | McEwan et al. | 83/437 |
| 2,905,210 | 9/1959 | Thomas | 83/437 |
| 3,830,127 | 8/1974 | James et al. | 83/435.1 |
| 3,982,740 | 9/1976 | Gutman | 269/110 |

*Primary Examiner*—Donald R. Schran
*Attorney, Agent, or Firm*—Harry B. O'Donnell, III

[57] ABSTRACT

This invention provides a novel and improved miter gauge for use with a cutting tool, such as a circular saw blade and the like, by employment of a guide rail that cooperates with a guide slot in the work surface on which the gauge is supported, such as a table saw and the like. Basically, the novel miter gauge of the present invention includes base means having both a left and a right-hand locating surface that are arranged at a right angle to each other and also has joined to it the guide rail. The gauge further includes adjustable clamping means mountable from the base means for selectively clamping a workpiece against either one of those two locating surfaces.

9 Claims, 5 Drawing Figures

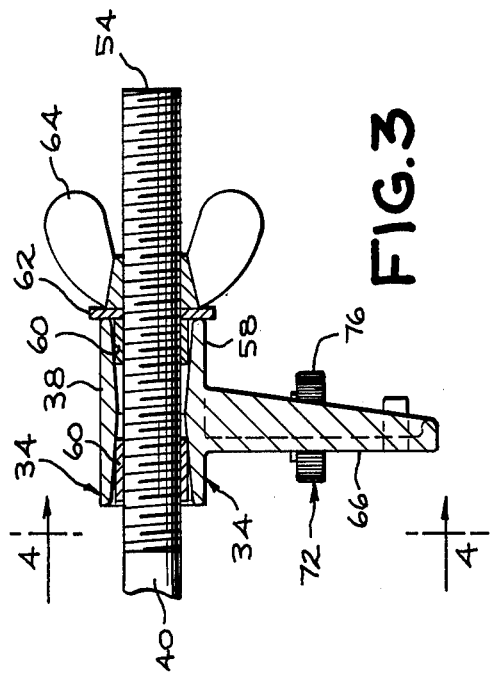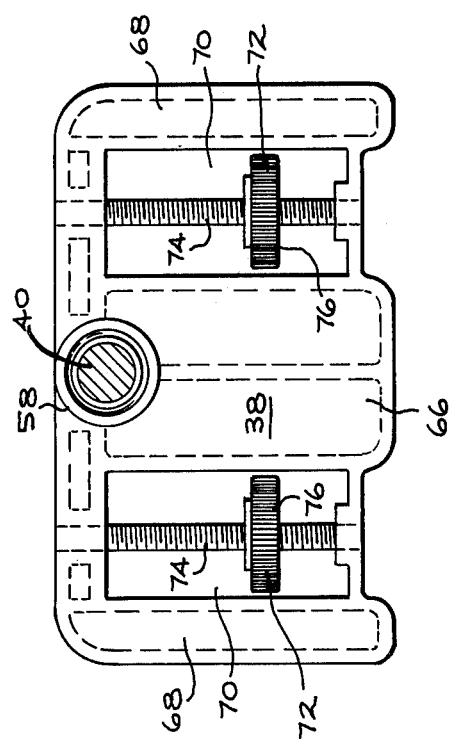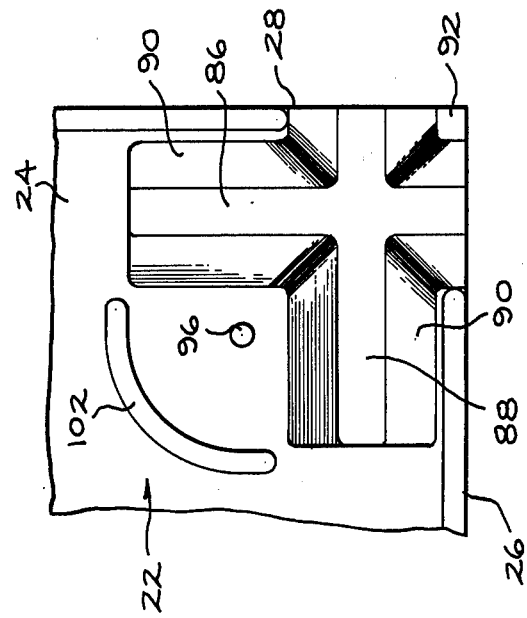

MITER GAUGE FOR TABLE SAW

BACKGROUND OF THE INVENTION

This invention relates to miter gauges to which a workpiece is to be engaged for cutting upon it of either a right-hand or a left-hand miter and, more particularly, to such a gauge which can be slidably mounted in the work surface of a table saw.

In the past, the conventional table saw method of cutting 45° miters, both left and right-hand, so as to make a perfect 90° joint, has been a tedious process for most home craftsman. The conventional adjustable "stops" for the the 45° positions are usually not set correctly at the factory, and it is up to the home craftsman to perform that task. Many persons can not do that adequately. Furthermore, continued use of the conventional miter gauge usually results in that setting changing from time to time, such that it is not always dependable.

Several prior-art forms of gauges and methods have been employed in the past.

U.S. Pat. No. 154,234 shows a form of an old miter box that has a base frame, an adjustable square block on the frame that cooperates with a pair of fixed triangular corner blocks for clamping the workpiece therebetween. The top of the square block has a pair of spaced guide blocks for guiding the travel of the hand saw therebetween. This old miter box may also serve as a corner clamp during gluing and nailing of the miter joint.

U.S. Pat. No. 778,642 describes a complicated, adjustable miter box device that is used for cutting a mitered joint by clamping together two work pieces in a crossed, over and under, arrangement such that they may both be cut with a circular saw at the same time. This old device is adjustable both angularly and vertically for altering the distance between the two crisscrossed workpieces. Its base has two parallel ribs which fit into parallel grooves in the bench of the saw so the apparatus may be moved toward or away from the saw in an accurate manner.

With the old device described in U.S. Pat. No. 790,182, it is intended that small sections of a ring of a given diameter are to be accurately cut at their ends such that those cut sections may be butted and glued together to form a complete ring. A triangular frame serves as an adjustable miter gauge, and the arcuate segment is clamped across the top of the frame. That frame includes a guide rail which is mountable in guide grooves formed in the table of the bench saw.

U.S. Pat. No. 1,452,233 describes a table saw bearing a longitudinal sliding section that supports an L-shaped frame, that includes two faces at right angles to each other which are provided with screw-mounted bars for forming a miter joint. The workpiece is adapted to be placed against either bar. With this old device, the cuts are made from the same side of the circular saw.

U.S. Pat. No. 2,010,882 illustrates a table saw with a self-indexing miter gauge that has a guide rail which travels in a guide slot in the table surface. The gauge has a vertical face which is adapted to form a rest for the workpiece. The gauge is angularly adjustable such that the angular relation of the vertical face may be varied. This gauge also has an adjustable extension which functions as an end gauge.

U.S. Pat. No. 2,752,960 describes an adjustable miter gauge that includes a screw-operated clamping member which is adjustable relative to the gauge. However, its clamping member has no vertically-adjustable means for preventing the workpiece from rotating during clamping. This old gauge also has a guide rail which travels in the guide slot of the table.

The present invention is directed toward providing a novel and improved miter gauge for making right-angular mitered joints on table saws for picture frames, door and window frames, mouldings and the like.

SUMMARY OF THE INVENTION

The present invention provides a novel and improved miter gauge for use with a cutting tool, such as a circular saw blade, by employment of a guide rail that cooperates with a guide slot in the work surface on which the gauge is supported, such as a table saw. Basically, the novel gauge of the present invention includes base means having both a left and a right-hand locating surface that are arranged at a right angle to each other and also has joined to it the guide rail. The gauge further includes adjustable clamping means mountable from the base means for selectively clamping a workpiece against either one of those two locating surfaces.

Both the left and right-hand locating surfaces are at an angle of 90° to each other and they are each at an angle of 45° with respect to the cutting tool, such as a rotary saw blade or a band saw. The novel miter gauge is furnished with a guide rail which is fixed to its base means and is slidable within the saw table miter slot, so as to guide the miter gauge in its travel with respect to the cutting tool. Thus, to cut a perfect joint, the left-hand miter is cut using the left-hand miter slot of a saw table. The right-hand miter is then cut to a perfect match simply by rotating the entire miter gauge 180° and using the right-hand slot of the saw table.

One important advantage of the present invention is its ability to clamp workpieces of irregular shapes, such as deep and relieved picture frame moulding. The slide guide rail and the two locating surfaces of the novel miter gauge of the present invention provide surfaces at an angle of 90° to each other to form the fixed portion of a "nest" for the workpiece. An adjustable jaw is provided for selective mounting from the gauge base means opposite either of the two locating surfaces. Preferably, this jaw also has a pair of vertically-adjustable pads which form the fourth surface to complete the "nest" which is important when holding irregular shapes in preparation for mitering. These pads bear down upon the top of the workpiece and prevent it from tending to rotate out of proper position as the clamping jaw is tightened against the workpiece.

BRIEF DESCRIPTION OF THE DRAWINGS

The present invention is illustrated in the accompanying drawings, wherein:

FIG. 3 is an enlarged fragmentary cross-sectional view taken along line 3—3 of FIG. 1 and showing the cooperation between the clamping screw and the clamping jaw with its tightening nut;

FIG. 4 is a view of the clamping jaw taken along line 4—4 of FIG. 3 and best showing the two vertically adjustable, screw-operated pads for applying a downward pressure onto irregular-shaped workpieces; and FIG. 5 is an enlarged fragmentary plan view of one corner of the miter gauge base means showing the nature of the pair of intersecting troughs or sockets for receiving and holding one end of the extension bar that supports the adjustable back-up plate that bears against one end of the workpiece so as to prevent slippage of the workpiece.

DETAILED DESCRIPTION

Figure 1:
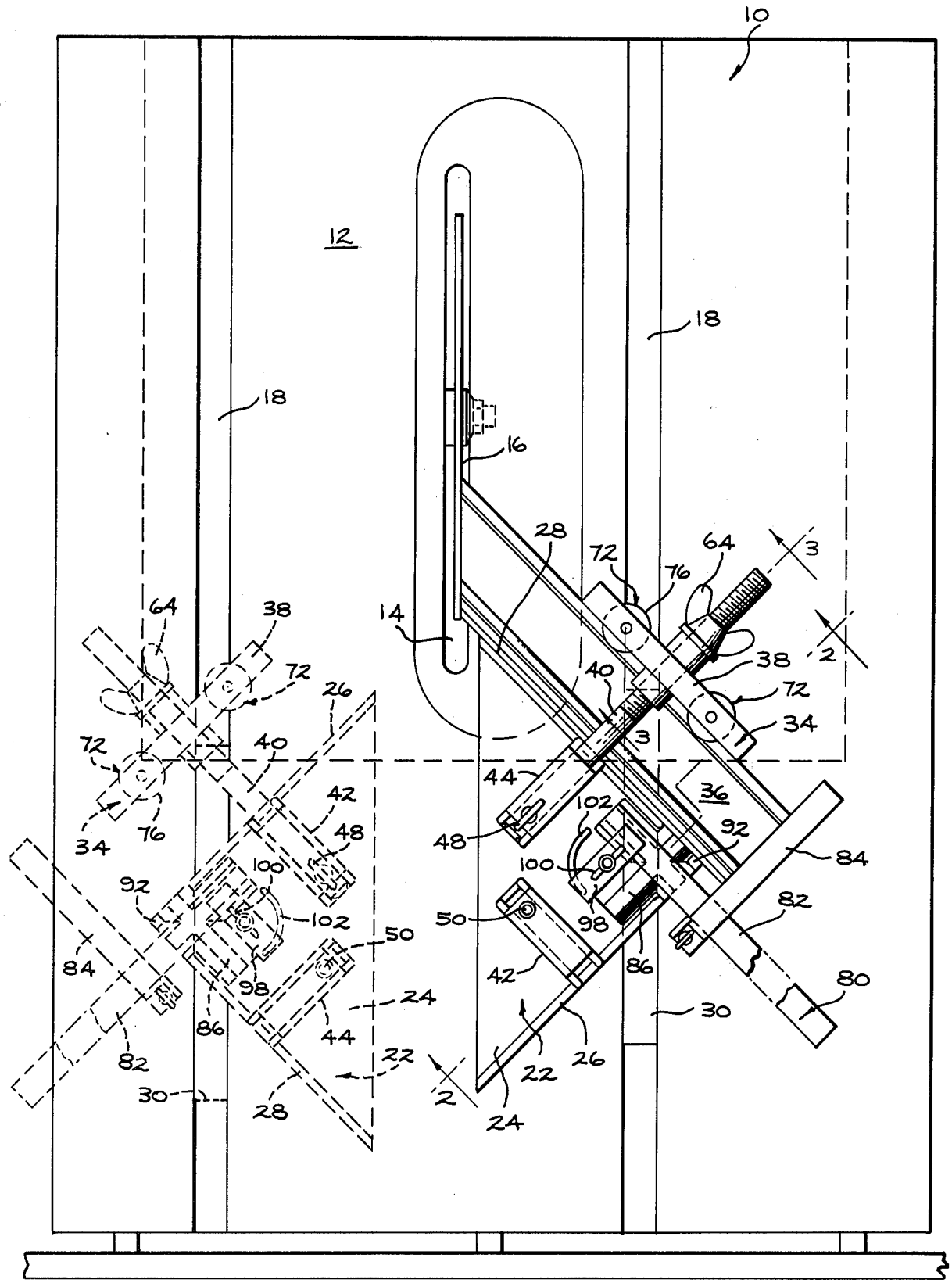
FIG. 1 is a top plan view of a typical table saw with a circular saw blade, having slidably mounted in the saw table top a presently preferred form of the novel miter gauge of the present invention, that is shown in solid lines positioned for cutting a right-hand miter in a workpiece, and that is shown in shadow lines alternatively positioned for cutting a left-hand miter in a workpiece.

Turning now to the drawings, and more particularly to FIG. 1 thereof, there is shown a typical table saw 10 having a horizontal work surface or saw table top 12 with a saw blade opening 14 and a circular saw blade 16 positioned therein. A groove or slot 18 is formed in the work surface 12 of the table on each side of the saw blade 16, and parallel thereto.

A presently preferred form of the novel and improved miter gauge 22 of the present invention is shown mounted on the table saw work surface 12. The gauge 22 includes a triangular base 24 having a left-hand, vertical locating surface 26, and a right-hand, vertical locating surface 28. These two locating surfaces 26 and 28 are at a right angle to each other. On the bottom of the base 24 there is fixed an elongate guide rail 30, which is arranged at a 45° angle to the planes of both locating surfaces 26 and 28, and it is adapted to fit snugly but slidably into either guide slot 18 in the table saw work surface 12. The movement of the miter gauge 22 is only allowed when the guide rail 30 slidably moves back and forth in the saw table groove or guide slot 18. Thus, there is maintained a fixed 45° relationship between the left and right-hand locating surfaces 26 and 28 and the saw blade 16.

Figure 2:
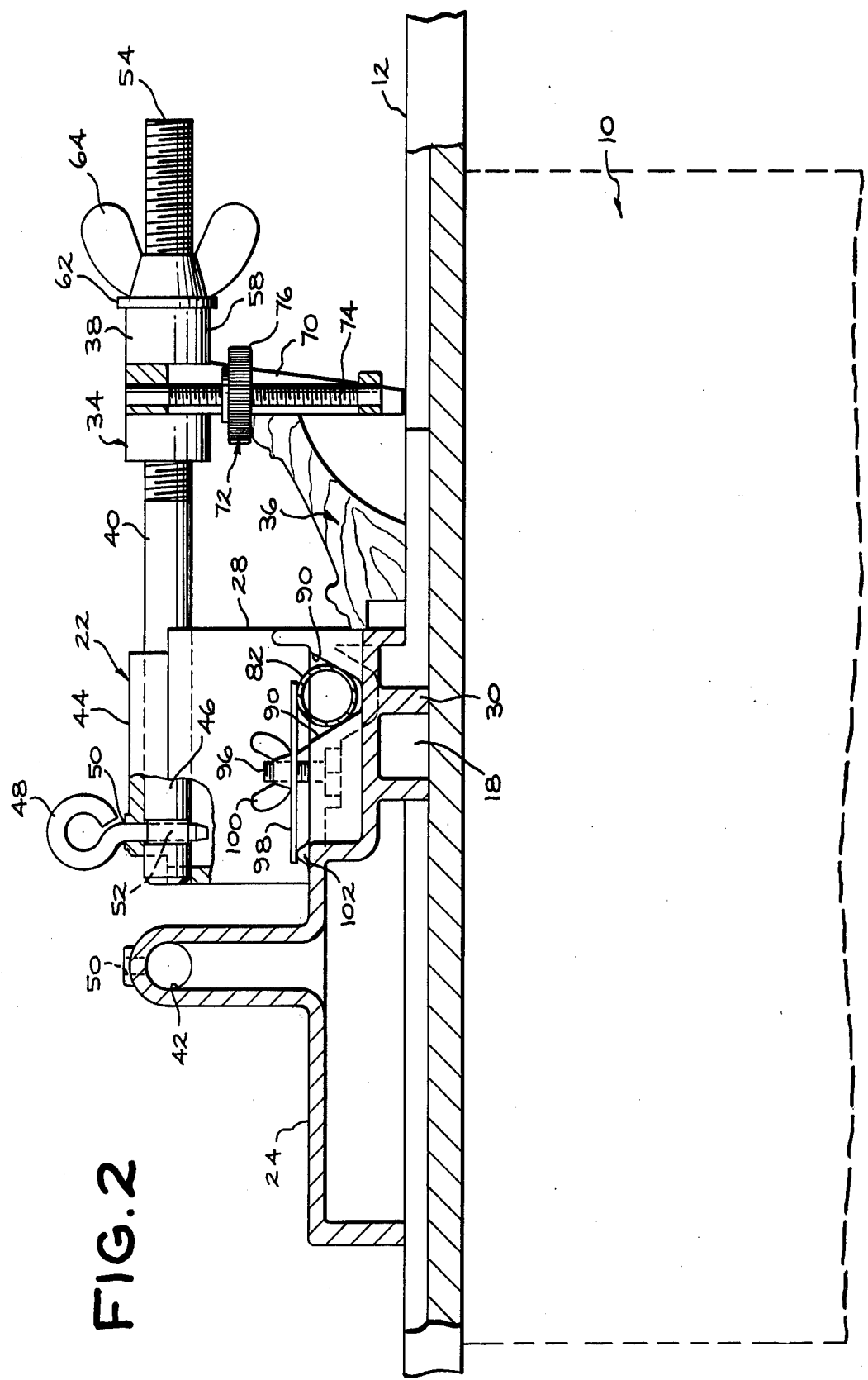
FIG. 2 is an enlarged fragmentary cross-sectional view through the miter gauge, taken along line 2—2 of FIG. 1, and showing a workpiece firmly clamped in place.

The miter gauge 22 further includes adjustable clamping means 34 mountable from the gauge base 24 for selectively clamping a workpiece 36 against either of the two locating surfaces 26 or 28. The clamping means 34 comprises a moveable jaw 38 carried by a clamping screw 40. The gauge base 24 includes a quick-connect screw socket 42 that is transversely arranged with respect to the left-hand locating surface 26, and a similar quick-connect screw socket 44 that is transversely arranged with respect to the right-hand locating surface 28. As is best shown in FIG. 2, the clamping screw 40 has an unthreaded end 46 which slips freely into the socket 44, and it is locked in place by a drift pin 48 which slips down into a top hole 50 in the socket 44 and through a matching hole 52 in the clamping screw 40.

The opposite end 54 of the clamping screw 40 is threaded. The movable jaw 38 has a socket portion 58 which slips freely onto the threaded end 54, as is best illustrated in FIG. 3. A bushing 60 is fitted into each end of the socket opening. A washer 62 and butterfly nut 64 are assembled on the end 54 of the clamping screw 40 for applying pressure against the jaw 38 and, hence, the workpiece 36.

The front face of the jaw 38 is best shown in FIG. 4, and it has a central portion 66 and two end posts 68. Between the central portion 66 and each end post 68 is an opening 70 in which is fitted a screw-operated pad 72, in effect, is a fixed vertical screw 74 and an enlarged nut 76. This nut or pad 76 is adapted to bear down upon the top of the workpiece 36 and exert upon the same a downward clamping action. These adjustable pads 76 are particularly useful in working with moldings or wood stock or irregular shapes. These pads 76 prevent the workpiece 36 from rotating out of a proper clamping position as the jaw 38 is tightened against the workpiece.

Another valuable aspect of the present invention, is the incorporation of an extension means 80 with the gauge base 24 in the form of an extension rod 82 and an adjustable backup plate 84 which bears against the end of the workpiece 36. The purpose of this extension plate is to serve as an end gauge and a further assistance in providing clamping means for the workpiece to prevent the workpiece from slippage or changing position when the miter gauge is moved to pass the workpiece through the circular saw blade 16.

The extension rod 82 may be a simple length of pipe or tubing, as it best shown in FIG. 2. The gauge base 24 is fitted with a pair of crossed channels 86 and 88, as is best illustrated in FIG. 5, which have upwardly and outwardly tapered side walls 90. These two channels 86 and 88 are positioned near the apex 92 of the triangular base 24 where the locating surfaces 26 and 28 meet. Hence, each channel 86 and 88 is associated with a locating surface such as 28 and 26, respectively. Associated with the channels 86 and 88 is a single fastening screw 96 which has a holding plate 98 and a butterfuly nut 100. Depending on which channel 86 or 88 the extension rod 82 is seated in, the holding plate 98 is swung over the end of the rod 82 and the nut 100 is tightened down in place. An arcuate bearing pad 102 is arranged concentrically with the vertical fastening screw 96 to support one end of the holding plate 98.

It should be apparent that while there has been described what is presently considered to be a presently preferred form of the present invention in accordance with the Patent Statutes, changes may be made in the disclosed device without departing from the true spirit and scope of this invention. It is, therefore, intended that the appended claims shall cover such modifications and applications that may not depart from the true spirit and scope of the present invention.

What is claimed is:

1. A miter gauge for use with a cutting tool having guide slots provided on opposite sides thereof in a work surface on which the gauge is to be supported comprising:
    (a) base means having two workpiece locating surfaces rigidly fixed thereto at a right angle to one another;
    (b) a guide rail joined to said base means for selectively cooperating with either of the guide slots in the work surface on which the gauge is to be supported; and
    (c) adjustable clamping means reversibly mountable on said base means for selectively clamping a workpiece against either one of the locating surfaces.

2. The invention of claim 1, wherein said adjustable clamping means comprises a movable jaw which includes vertically adjustable means that can engage a workpiece.

3. The invention of claim 2, wherein the said vertically adjustable means comprises at least one screw-operated pad for bearing down upon a workpiece.

4. The invention of claim 1, wherein said base means includes extension means with an adjustable backup means that can engage the workpiece and prevent slippage thereof.

5. The invention of claim 4, wherein each said locating surface of said base means includes quick-connect means that can receive and hold said extension means such that the extension means is reversible in either quick-connect means depending upon which locating surface the workpiece is to be clamped against.

6. The invention of claim 1, wherein said adjustable clamping means includes a quick-connect clamping screw joined to said base means and a movable jaw supported on said screw, and tightening means for changing the position of said jaw on said clamping screw.

7. The invention of claim 6, wherein each said locating surface of said base means includes a quick-connect screw socket for receiving said clamping screw of said clamping means.

8. The invention of claim 7, wherein each said locating surface of said base means includes quick-connect means that can receive and hold extension means having adjustable backup means for engaging the end of the workpiece and preventing the workpiece from slippage.

9. The invention of claim 3, wherein said adjustable clamping means further includes a clamping screw that is removably attached to the base means as well as tightening means for holding the jaw against a workpiece.

* * * * *